(12) United States Patent
Chadha

(10) Patent No.: US 7,382,352 B2
(45) Date of Patent: Jun. 3, 2008

(54) OPTICAL JOYSTICK FOR HAND-HELD COMMUNICATION DEVICE

(75) Inventor: Lovleen Chadha, San Diego, CA (US)

(73) Assignee: Siemens Aktiengesellschaft, Munich (DE)

( * ) Notice: Subject to any disclaimer, the term of this patent is extended or adjusted under 35 U.S.C. 154(b) by 724 days.

(21) Appl. No.: 10/868,432

(22) Filed: Jun. 14, 2004

(65) Prior Publication Data

US 2005/0275623 A1    Dec. 15, 2005

(51) Int. Cl.
*G09G 5/00*     (2006.01)
*G06F 3/02*     (2006.01)
*G06F 3/33*     (2006.01)

(52) U.S. Cl. .................... 345/156; 345/169; 345/179
(58) Field of Classification Search ......... 345/156–179
See application file for complete search history.

(56) References Cited

U.S. PATENT DOCUMENTS

| | | |
|---|---|---|
| 4,782,327 A | 11/1988 | Kley et al. |
| 4,856,785 A | 8/1989 | Lantz et al. ................ 273/148 |
| 5,394,168 A | 2/1995 | Smith, III et al. .......... 345/156 |
| 5,621,207 A | 4/1997 | O'Mara .................... 250/221 |
| 6,121,955 A | 9/2000 | Liu ........................... 345/161 |
| 6,160,537 A | 12/2000 | Liu et al. ................... 345/161 |
| 6,184,518 B1 | 2/2001 | Klein ....................... 250/231.8 |
| 6,259,433 B1 | 7/2001 | Meyers ...................... 345/161 |
| 6,373,466 B2 | 4/2002 | Salcudean et al. .......... 345/161 |
| 6,429,848 B2 | 8/2002 | Merminod et al. ......... 345/157 |
| 6,597,453 B1 | 7/2003 | Shu-Ming ................... 356/392 |
| 6,628,266 B1 | 9/2003 | Aguilar et al. .............. 345/161 |
| 6,740,863 B2 | 5/2004 | Sawyer et al. .............. 251/221 |
| 2002/0105503 A1 | 8/2002 | Oueslati et al. ............. 345/173 |
| 2002/0149564 A1 | 10/2002 | Simpson ..................... 345/161 |
| 2003/0052861 A1 | 3/2003 | Peng .......................... 345/161 |
| 2003/0076302 A1 | 4/2003 | Langstraat |
| 2003/0095708 A1 | 5/2003 | Pittel |
| 2004/0036677 A1 | 2/2004 | Ono et al. |

FOREIGN PATENT DOCUMENTS

EP    0 716 389 A1    6/1996
FR    2 824 926 A1    11/2002

OTHER PUBLICATIONS

Mobile Show Spotlights Gadgets on the Go- News Headlines; http://www.mobiledia.com/forum/topic4473.html; May. 26, 2004.
Anonymous: "Coded Sphere Joystick. Nov. 1976"; IBM Technical Disclosure Bulletin, vol. 19, No. 6; Nov. 1, 1976, pp. 2226-2227, New York, USA.

*Primary Examiner*—David L. Lewis

(57) ABSTRACT

An optical joystick for a hand-held communication device employs an image capture device for sensing movement of a stylus by capturing images of the stylus or a target attached to a socket receiving the stylus. The captured images are processed for tracking movement of the stylus so that movement of the stylus may be used for controlling functions of the hand-held communication device.

19 Claims, 3 Drawing Sheets

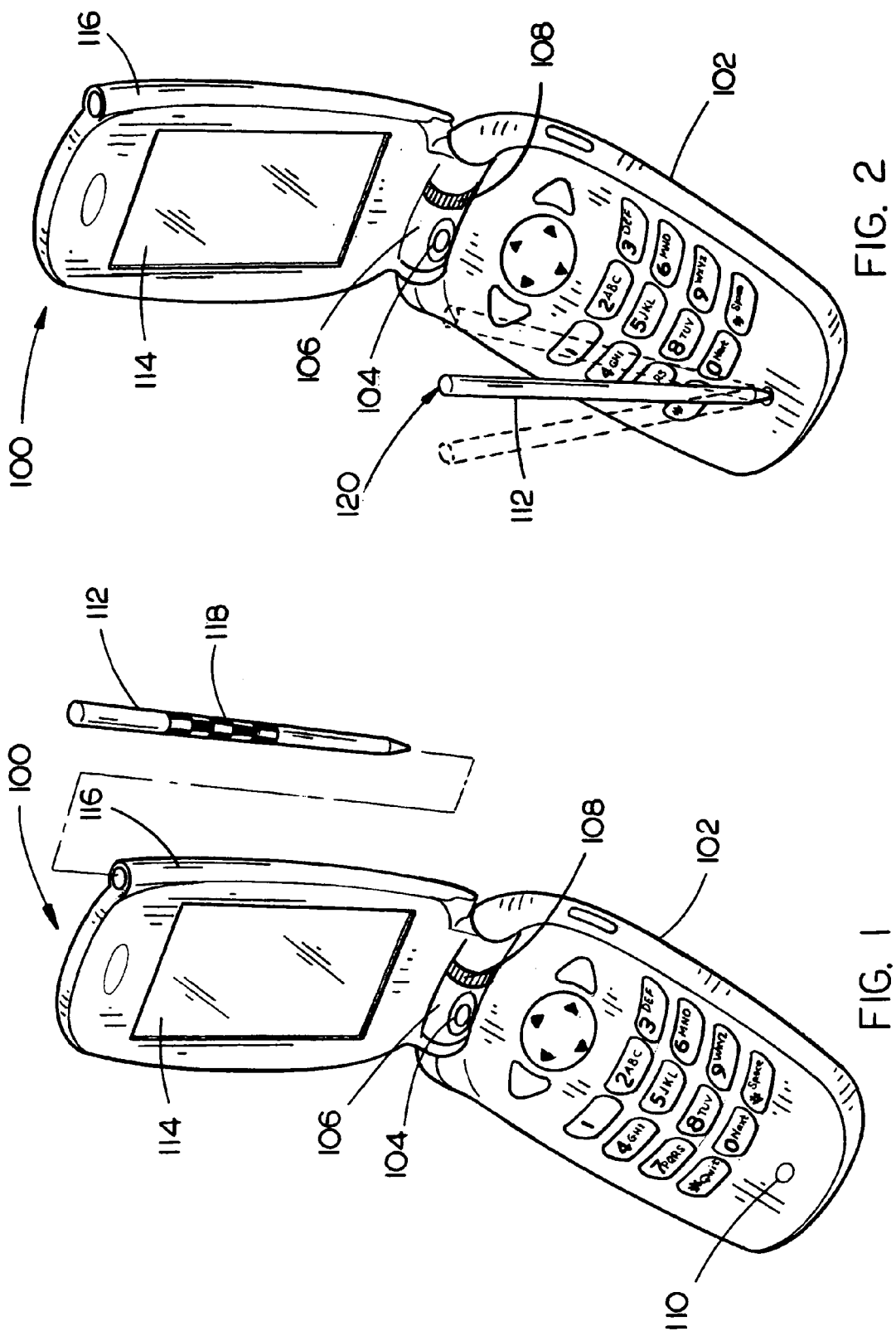

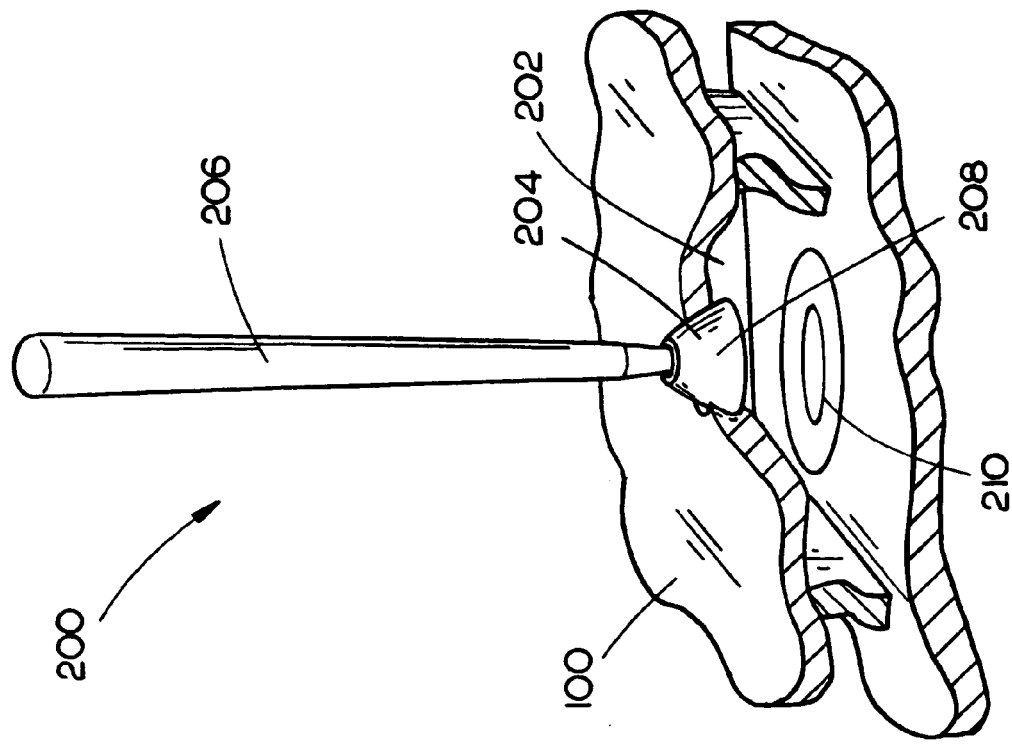
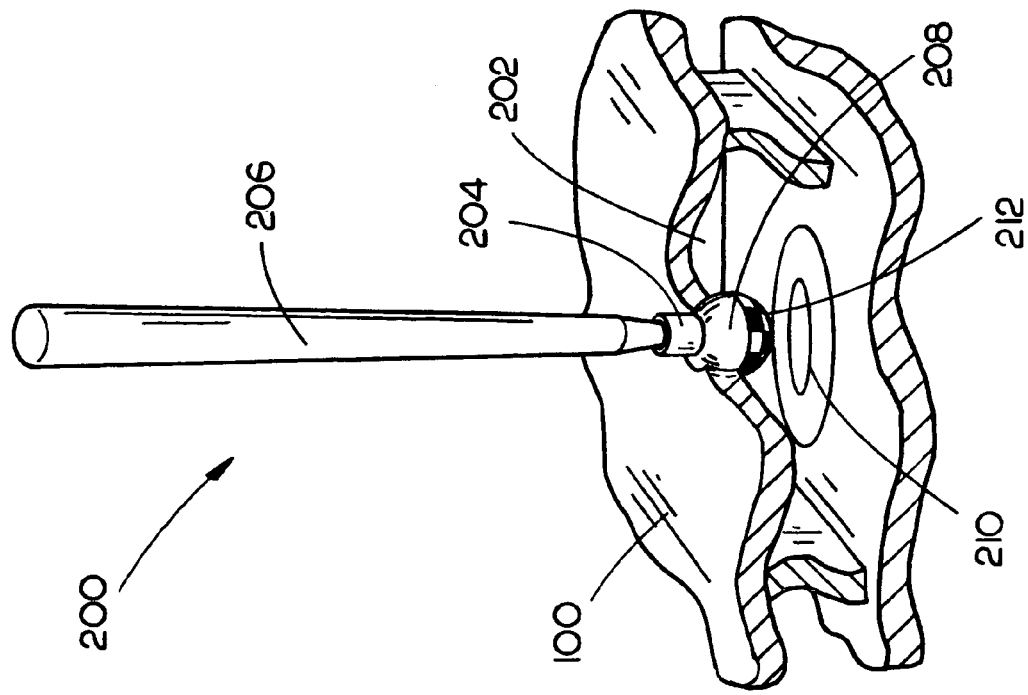

OPTICAL JOYSTICK FOR HAND-HELD COMMUNICATION DEVICE

BACKGROUND OF THE INVENTION

The present invention relates generally to hand-held communication devices such as mobile telephones, palmtop computers, personal digital assistants (PDA's) or the like, and more particularly, to an optical joystick for hand-held communication devices.

Hand-held communication devices, particularly mobile telephones, personal digital assistants (PDA's), and the like, comprise a class of portable electronic devices, whose size enables them to be held in one hand while being operated with the other. Typical hand-held communication devices include a display, which may include a digitizer or touch sensitive overlay for allowing a user to enter information and commands using a stylus or pen, and a keypad for entering alphanumeric text, common commands, selecting menus to be displayed by the display, and the like. Often, such hand-held communication devices include a small digital camera, allowing the user of the device to take digital photographs, which may be stored in the device's memory, and transmitted to others via a communication network.

Many hand-held communication devices support sophisticated software applications such as address book and calendar software, Internet browsers, text messaging, and the like. Such software applications require graphical user interface software employing a cursor for selection of menu items, entering of commands, and the like. Many hand-held communication devices further support gaming applications for the entertainment of their users. Such gaming applications often employ characters that must be precisely manipulated while playing the game.

Controls provided by hand-held communication devices (i.e., the keys of the keypad, the stylus/digitizer, and the like) do not readily allow accurate manipulation of indicia such as a cursor or gaming character, since the controls are clumsy to use and do not support true 360 degree movement of the indicia. Moreover, control devices such as mouses, trackballs, joysticks, and the like typically employed by computers are too bulky for use with hand-held communication devices due to the small size of the devices. As a result, users often find software or gaming applications supported by the hand-held devices difficult to use, lessening the utility of the devices to the user.

SUMMARY OF THE INVENTION

The present invention is directed to an optical joystick for a hand-held communication device that employs an image capture device such as a camera, an optical sensor, or the like, for sensing movement of a stylus, allowing the stylus to be used like a conventional joystick for controlling functions of the hand-held communication device.

In one specific embodiment, the optical joystick employs a camera disposed in the housing of a hand-held communication device for capturing images of a stylus used as a joystick as the stylus is moved with respect to the housing. The captured images are processed for tracking movement of the stylus.

In a second specific embodiment, the optical joystick includes a chamber formed within the housing and a socket, extending into the chamber, for receiving an end of a stylus. An image capture device is disposed in the chamber for capturing images of a target included with the socket, which are processed for tracking movement of the stylus.

It is to be understood that both the foregoing general description and the following detailed description are exemplary and explanatory only and are not necessarily restrictive of the invention claimed. The accompanying drawings, which are incorporated in and constitute a part of the specification, illustrate embodiments of the invention and together with the general description, serve to explain the principles of the invention.

BRIEF DESCRIPTION OF THE DRAWINGS

FIG. 1 is an isometric view illustrating a hand-held communication device having an optical joystick in accordance with an exemplary embodiment of the present invention;

FIG. 2 is an isometric view of the hand-held communication device shown in FIG. 1, illustrating operation of the optical joystick;

FIGS. 3 and 4 are partial cross-sectional isometric views of a hand-held communication device such as the hand-held communication device shown in FIGS. 1 and 2, further illustrating internal optical sensors for sensing the position of the stylus in accordance with a second exemplary embodiment of the present invention;

DETAILED DESCRIPTION OF SPECIFIC EMBODIMENTS

Figure 5:
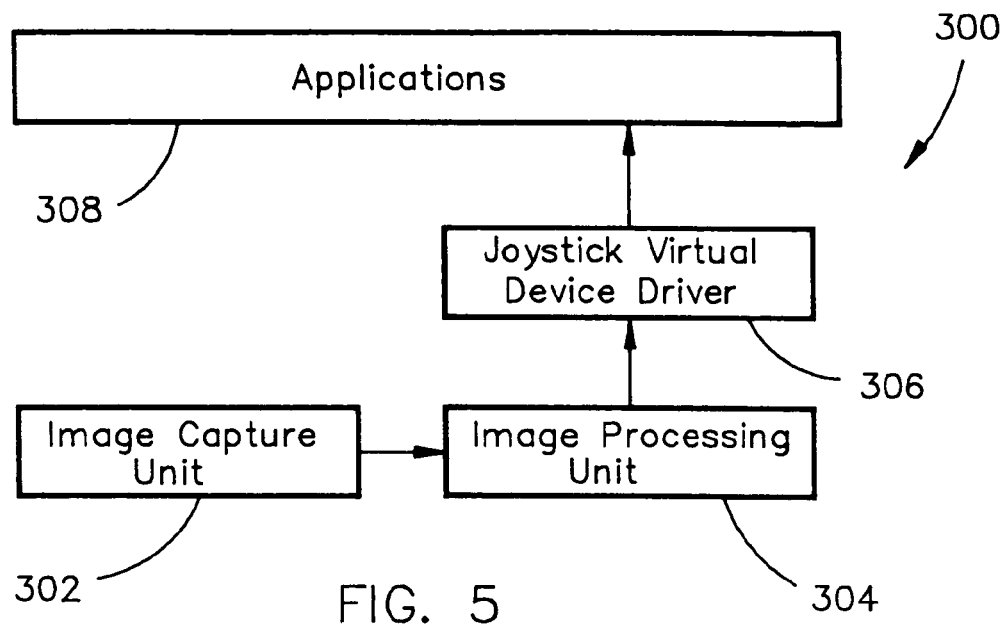
FIG. 5 is a block diagram illustrating an exemplary image processing system in accordance with the present invention.

Reference will now be made in detail to the presently preferred embodiments of the invention, examples of which are illustrated in the accompanying drawings.

FIGS. 1 and 2 illustrate a hand-held communication device 100 in accordance with an exemplary embodiment of the present invention. The hand-held communication device 100 includes a housing 102 having an image capture device 104. In exemplary embodiments, the image capture device 104 comprises a camera (e.g., a digital camera, a digital video camera, or the like) suitable for capturing images of persons, objects, or the like, near the hand-held communication device 100. The image capture device 102 is supported in the housing 104 by a swivel assembly 106 allowing a user of the hand-held communication device 100 to swivel the image capture device 104, positioning the device 102 at various angles with respect to the housing 104. For example, the user, by rotating or swiveling the swivel assembly, may rotate the image capture device 102 to face the user, or to face away from the user. The swivel assembly 106 includes a thumb wheel 108, e.g. a ridged or burled portion, for allowing the user to more easily swivel the image capture device 102.

The housing 102 of the hand-held communication device 100 may further include a socket 110 for receiving an end of a stylus 112. In the embodiment illustrated in FIGS. 1 and 2, the socket 110 comprises an indentation (e.g., a semi-circular or conical depression) in which the end of the stylus 112 is placed so that the stylus may be moved in the fashion of a conventional joystick. As shown, the stylus 112 may be provided with the hand-held communication device 100, for example, for use with a touch screen digitizer overlaying the display 114 of the hand-held communication device 100. In such embodiments, the housing may further include a sleeve 116 for storing the stylus 112 when the stylus 112 is not in use. Alternatively, the stylus 112 may comprise a pencil, a pen, the user's finger, or other stylus-shaped member without departing from the scope and spirit of the present invention.

In accordance with the present invention, an end of the stylus 112 is received in the socket 110, allowing the stylus 112 to be manipulated by the user in the manner of a conventional joystick. The image capture device 104 captures images of the stylus 112 which are processed by the hand-held communication device 100 for tracking movement of the stylus 112, which is converted to joystick inputs for software applications supported by the hand-held communication device 100. For instance, wherein the image capture device 104 comprises a digital camera, digital image processing may be used to process successive images captured by the digital camera. By analyzing movement of the stylus 112 across the successive digital images, the movement of the stylus 112 may be converted to joystick inputs, e.g. up-down, left-right, diagonal, or the like. Further, because movement of the stylus 112 is continuously variable, analog joystick inputs may be generated by the hand-held communication device 100.

Indicia 118, such as a geometric pattern, a lined pattern, or the like, may be printed on the surface of the stylus 112 for improving the performance of image processing by the hand-held communication device 100. Alternatively, the surface of the stylus 112 may be made a color or given a finish that is more readily captured by the image capture device 102, which can optionally have a focusing lens to help determine distances that the stylus 112 may be moved away from the image capture device 102. Further, the user may be allowed to specify the type, design, and/or size of a stylus 112 used, so that the stylus may be more easily identified and tracked during image processing. It is contemplated that various other image processing techniques may be used for identifying the stylus 112. The use of such techniques would not depart from the scope and intent of the present invention.

Those of skill in the art will appreciate that movement detectable by the image capture device 102 (e.g. by the digital camera, digital video camera, or the like) will be limited by the resolution provided by the device. Thus, two or more image capture devices 102 may be provided if necessary. Additionally, in some embodiments it may be necessary to utilize two or more image capture devices 102 for sensing two or three-dimensional movements, particularly, movement of the stylus 112 toward and away from the image capture device 104. These additional image capture devices 102 may capture images of the stylus 112 from various angles for more readily tracking two or three-dimensional movement of the stylus 112.

The joystick inputs generated from the tracked movement of the stylus 112 may be used for controlling a function of the hand-held device. For example, the device may use movement of the stylus 112 for accurate manipulation of information and/or indicia such as a cursor or gaming character displayed by the display 114. In this manner, the image capture device 102 and the stylus 112 comprise an optical joystick 120 that may be used in the same manner as a conventional or analog joystick, for controlling information displayed by the display 114. Alternatively, the optical joystick 120 may be used for controlling another device coupled to the hand-held communication device 100, such as a third-party device in radio communication with the hand-held communication device 100. In this manner, the optical joystick 120 may be used as a controller for remotely controlling devices such as industrial machinery, remote controlled vehicles, robotic machinery, remotely located computer equipment, or the like.

Referring now to FIGS. 3 and 4, an optical joystick 200 for a hand-held communication device, such as the hand-held communication device 100 shown in FIGS. 1 and 2, is described in accordance with a second exemplary embodiment of the present invention. The optical joystick 200 includes a chamber 202, formed within the hand-held communication device. A socket 204 for receiving an end of a stylus 206 extends into the chamber 202. The socket 204 may include a receptacle (e.g., a tube, a sleeve, a conical boot, or the like) for receiving the end of the stylus 206. The stylus 206 may be provided with the hand-held communication device, for example, for use with a touch screen digitizer overlaying the display of the device. Alternatively, the stylus 112 may comprise a pencil, a pen, the user's finger, or other stylus-shaped member without departing from the scope and spirit of the present invention.

In accordance with the present invention, an end of the stylus 206 is received in the socket 204, allowing the stylus 206 to be manipulated by the user in the manner of a conventional joystick. The socket 204 includes a target 208 disposed within the chamber 202. An image capture device 210 is disposed in the chamber 202 for capturing images of the target 208. The chamber 202 may further include a light source such as a light emitting diode (LED), or the like, for illuminating the target 208 to supply sufficient reflected light for the image capture device 210. Alternatively, a wall of the chamber 202 is formed of transparent or translucent material for providing light from the keypad or display backlight of the hand-held communication device.

The image capture device 210 captures images of the target 208 which are processed by the hand-held communication device 100 for tracking movement of the stylus 112, which is converted to joystick inputs for software applications supported by the hand-held communication device 100. For instance, digital image processing may be used to process successive images captured by a digital camera. By analyzing movement of the target 208 across the successive digital images, the movement of the target 208, and thus movement of the stylus 112, may be converted to joystick inputs, e.g. up-down, left-right, diagonal, or the like. Further, because movement of the stylus 206, and thus movement of the target 208, is continuously variable, analog joystick inputs may be generated by the hand-held communication device 100.

The target 208 may have any shape suitable for being tracked by the image capture device 210. For example, in FIG. 3, a spherical target is shown, while in FIG. 4, a conical target is illustrated. Additionally, the target 208 may be of a color that contrasts with the color of the walls of the chamber 202. For instance, the target 208 may be colored black, while the chamber 202 is colored white. Indicia 212, such as a geometric pattern, a lined pattern, or the like may also be printed on the surface of the target 112 for improving the performance of image processing by the hand-held communication device 100, and the image capture device 210 can optionally have a focusing lens to help determine distances that the stylus 112 may be moved away from the image capture device 210. Two or more image capture devices 210 may be provided, if necessary, due to the resolution provided by the image capture devices used. These additional image capture devices 210 may capture images of the target 208 from various angles in order to more readily track movement of the target 208.

The joystick inputs generated from the tracked movement of the stylus 206 and target 208 may be used for controlling a function of the hand-held device, such as, for example, providing accurate manipulation of information and/or indicia displayed by the display of the hand-held communication device. The optical joystick 200 may further be used for controlling another device coupled to the hand-held communication device, such as a third-party device (e.g., industrial machinery, remote controlled vehicles, robotic machinery, remotely located computer equipment, or the like) in radio communication with the hand-held communication device 100.

Referring to FIG. 5, an exemplary image processing system 300 in accordance with the present invention is described. The image processing system 300 includes an image capture module or unit 302 which receives images of the stylus or target, captured by the image capture device. The images are then transferred to an image processing module or unit 304. The image processing unit 304 tracks movement of the stylus or target and provides an output signal corresponding to the tracked movement. The image processing unit 304 may provide noise filtering, pattern extraction, pattern recognition, and the like, as necessary to facilitate tracking. The output signal from the image processing unit 304 is provided to a joystick virtual device driver 306 where it is converted to joystick inputs for the hand-held communication device. In embodiments of the invention, the joystick virtual device driver 306 transfers the joystick inputs (derived from movement of the stylus or target) to an application 308 being executed by the processing system of the hand-held communication device. Preferably, the joystick virtual device driver 306 is capable of buffering and/or queuing a series of joystick inputs, until the application 308 is ready to receive those inputs.

The image processing unit 304 may be optimized for a specific pattern, such as a stored image and/or pattern of a stylus or target, a color, indicia comprising a pattern, or the like. In order to detect a neutral position for an optical joystick, i.e. when no movement of the stylus or target is indicated by the joystick virtual device driver 306, a representation of an image or pattern for a desired neutral position may be stored as a reference within the internal memory of the hand-held communication device. Movement of the optical joystick from the neutral position may then be detected by comparing images captured by the image capture device against the stored image. However, it should be noted that the stored image may not match an expected or desired neutral position. Recalibration may then be enabled, wherein a new image or pattern is stored to represent the expected or desired neutral position of the stylus or target. For instance, a user may move the stylus or target to a desired neutral position and then indicate the neutral position to the hand-held communication device, which captures an image of the stylus or target in the neutral position and stores it in memory for reference.

It is further contemplated that the pre-specified shape of the stylus or target, varying colors, indicia comprising a pattern, or the like may be used to detect rotational movement of the stylus or target. For example, a user may twist the stylus between a thumb and forefinger, rotating the stylus while moving the stylus in a joystick-like manner. If varying colors, varying shapes, and/or indicia are provided with the stylus, for instance, the image processing unit 304 may track this rotation and transfer the rotational data to the joystick virtual device driver 306, which may then transfer the rotational data as joystick inputs to the application 308. Those of skill in the art will appreciate that other movement of the stylus or target may be detectable as well, including movement away from the socket, which may, for example, power down the image capture device for power saving or the like, or may provide an additional degree of freedom for movement of the stylus.

Figure 6:
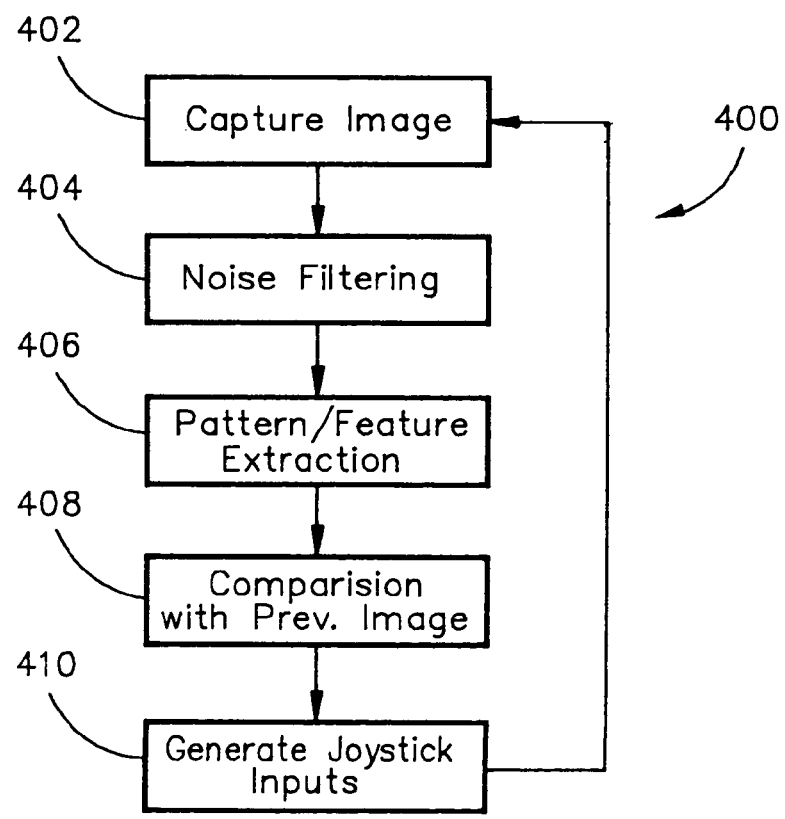
FIG. 6 is a flow diagram illustrating an exemplary method for providing a joystick for a hand-held communication device.

Referring to FIG. 6, a method 400 for providing a joystick for a hand-held communication device having an image capture device is described. An image captured by an image capture device such as a digital camera, or the like, is received, at step 402. Using noise filtering, extraneous data and/or noise is removed from the image, at step 404. Then, at step 406, pattern/feature extraction (e.g. pattern recognition) is used to determine a position for a stylus or target. The determined position of the stylus or target is next compared with a previous position (derived from a previous image or a stored image), at step 408, and joystick inputs are generated for transfer to an application running on the hand-held communication device, at step 410. Alternatively, the pattern/feature extraction in step 406 is used to compare the image from the image capture device to a previous image or pattern, i.e. a stored image or pattern of the stylus or target in a neutral position. By comparing the two images, in step 408, a difference in position for the joystick or target between the current and previous images is determined and used to generate joystick inputs and/or coordinates for transfer to an application running on the hand-held communication device.

In the exemplary embodiments, method 400 may be implemented as sets of instructions or software readable by the processing system of the hand-held communication device 100. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

In FIGS. 1 through 6, the hand-held communication device 100 illustrated is generally shown in "brick" form with most ornate features eliminated. However, those of ordinary skill in the art will recognize that mobile communication devices 100 in accordance with the present invention are not limited to the specific configurations disclosed herein, but instead may employ form factors having other ornamental or functional design features without departing from the scope and intent of the present invention. For example, FIGS. 1 and 2 illustrate the mobile communication device 100 embodied as a folding mobile telephone or "flip-phone" having a clam-shell housing wherein the image capture device comprises a camera mounted within a swivel assembly in the clam-shell hinge. However, it is contemplated that the present invention may be implemented in other types of hand-held communication devices 100, including, but not limited to, mobile telephones having forms other than those specifically illustrated (e.g., mobile telephones having unitary housings, mobile telephones having two-piece housings that slide with respect to one another), Personal Digital Assistants (PDA's), hand-held gaming devices, and the like. Moreover, placement of the image capture device is not limited to the hinge of the clam-shell housing as illustrated. For example, the image capture device 102 may be located elsewhere within the housing or provided as an attachment for coupling with the hand-held communication device 100 (e.g., as a clip-on assembly or the like).

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A hand-held communication device, comprising:
a housing;
a swivel assembly coupled to said housing;
a stylus; and
an image capture device in said swivel assembly for capturing images of the stylus;
wherein the captured images of the stylus are processed for tracking movement of the stylus with respect to the housing, the movement of the stylus being used for controlling a function of the hand-held communication device, the swivel assembly providing an adjustment of an angle of said image capture device with respect to said housing.

2. The hand-held communication device as claimed in claim 1, wherein the image capture device comprises a digital camera assembly disposed in the hand-held communication device, the digital camera assembly including a digital camera for capturing the images of the stylus.

3. The hand-held communication device as claimed in claim 1, wherein the stylus comprises indicia, the image capture device capturing images of the indicia for tracking movement of the stylus.

4. The hand-held communication device as claimed in claim 1, further comprising a socket for receiving the stylus, the stylus being capable of joystick motion when received in the socket.

5. The hand-held communication device as claimed in claim 1, wherein the hand-held communication device comprises a display, and the function controlled comprises the display of information by the display.

6. A hand-held communication device, comprising:
a housing having a display for displaying information;
a swivel assembly disposed in the housing;
a camera disposed in the swivel assembly for capturing images of a stylus, the stylus being capable of movement with respect to the housing;
wherein the captured images of the stylus are processed for tracking movement of the stylus, the movement of the stylus being used for controlling the display of information by the display, the swivel assembly providing an adjustment of an angle of said camera with respect to said housing.

7. The hand-held communication device as claimed in claim 6, wherein the stylus comprises indicia, the image capture device capturing images of the indicia for tracking movement of the stylus.

8. The hand-held communication device as claimed in claim 6, further comprising a socket for receiving the stylus, the stylus being capable of joystick motion when received in the socket.

9. An optical joystick for a hand-held communication device, comprising:
a chamber formed within the hand-held communication device;
a socket for receiving an end of a stylus, the socket extending into the chamber and including a target; and
an image capture device disposed in the chamber for capturing images of the target,
wherein the captured images of the target are processed for tracking movement of the stylus, the movement of the stylus being used for controlling a function of the hand-held communication device.

10. The optical joystick as claimed in claim 9, wherein the target comprises indicia, the image capture device capturing images of the indicia for tracking movement of the stylus.

11. The optical joystick as claimed in claim 9, wherein the hand-held communication device comprises a display, and the function controlled comprises the display of information by the display.

12. A hand-held communication device, comprising:
a housing having a display for displaying information;
a chamber formed within the housing;
a socket for receiving an end of a stylus, the socket extending into the chamber and including a target; and
an image capture device disposed in the chamber for capturing images of the target,
wherein the captured images of the target are processed for tracking movement of the stylus, the movement of the stylus being used for controlling the display of information by the display.

13. The hand-held communication device as claimed in claim 12, wherein the target comprises indicia, the image capture device capturing images of the indicia for tracking movement of the stylus.

14. The hand-held communication device as claimed in claim 1, wherein said swivel assembly includes a thumb wheel.

15. The hand-held communication device as claimed in claim 6, wherein said swivel assembly includes a thumb wheel.

16. The hand-held communication device as claimed in claim 3, wherein said indicia includes a geometric pattern.

17. The hand-held communication device as claimed in claim 3, wherein said indicia includes a unique color.

18. The hand-held communication device as claimed in claim 7, wherein said indicia includes a geometric pattern.

19. The hand-held communication device as claimed in claim 7, wherein said indicia includes a unique color.

* * * * *